United States Patent [19]

Schnitzler

[11] Patent Number: 4,518,994
[45] Date of Patent: May 21, 1985

[54] COMMUNICATION SYSTEM COMPANDOR

[75] Inventor: Paul Schnitzler, Kendall Park, N.J.

[73] Assignee: RCA Corporation, Princeton, N.J.

[21] Appl. No.: 451,743

[22] Filed: Dec. 20, 1982

[51] Int. Cl.³ .............................................. H04N 7/12
[52] U.S. Cl. .................... 358/133; 358/138; 381/34
[58] Field of Search .................. 358/133, 138; 381/29, 381/30, 31, 34, 38

[56] References Cited

U.S. PATENT DOCUMENTS

| Re. 30,468 | 12/1980 | Dolby et al. | 455/72 |
| 3,795,876 | 3/1974 | Takahashi et al. | 381/29 |
| 4,054,909 | 10/1977 | Kojima et al. | 358/13 |
| 4,163,258 | 7/1979 | Ebihara et al. | 358/167 |
| 4,191,968 | 3/1980 | Kirk, Jr. | 358/141 |
| 4,200,889 | 4/1980 | Strobele | 358/167 |

Primary Examiner—John C. Martin
Assistant Examiner—Edward L. Coles
Attorney, Agent, or Firm—J. S. Tripoli; R. L. Troike; W. H. Meise

[57] ABSTRACT

In a signal transmission system comprising a transmitter, a transmission medium, and a receiver which collectively form a transmission path, an improvement for processing the signal to enable the transmission thereof over a narrower bandwidth and comprising first logic for decreasing and increasing, respectively, the rate of change of amplitude (dA/dt) of first and second portions of the signal, respectively, whose dA/dt's exceed or are less than a predetermined dA/dt, by amounts which increase at a non-linear rate as the dA/dt of the first and second portions increase or decrease, respectively, to produce a processed signal whose maximum and minimum dA/dt's define a bandwidth narrower than that of the unprocessed signal. Second logic is provided for altering the dA/dt of the processing signal at the receiver in a manner which is the reciprocal of the changes in dA/dt which occurred at the transmitter to reproduce the unprocessed signal.

3 Claims, 9 Drawing Figures

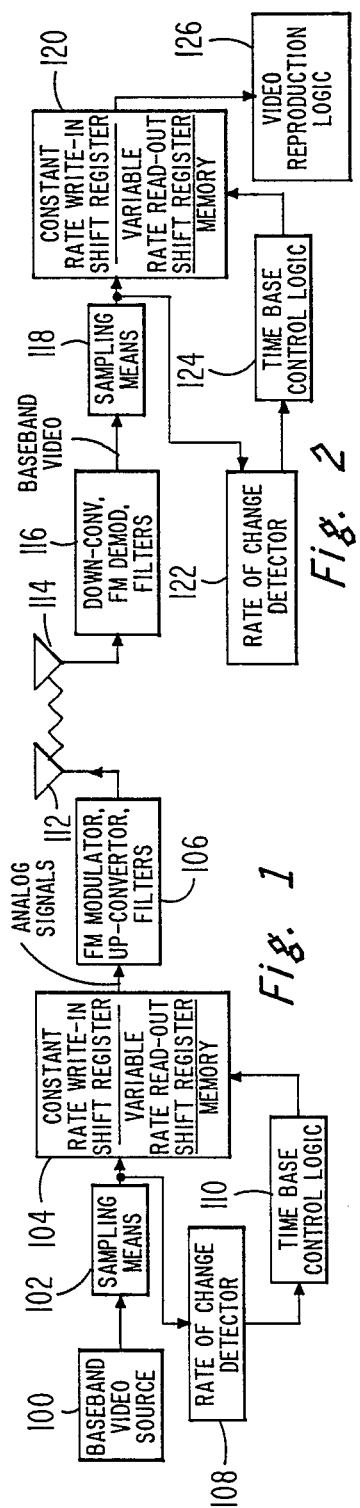
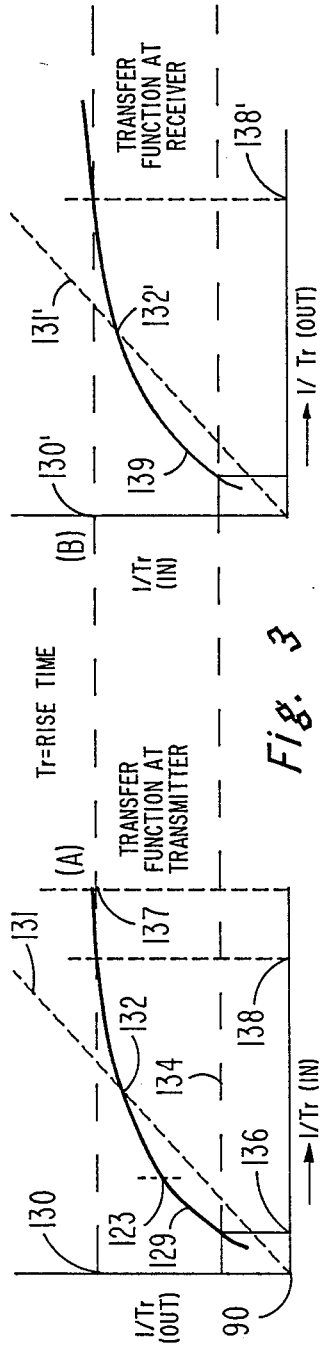
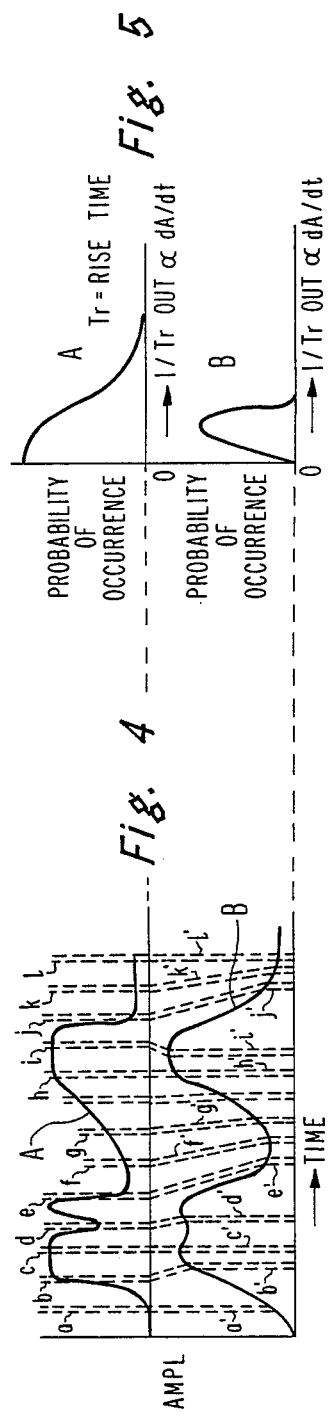
Fig. 1
Fig. 2
Fig. 3
Fig. 4
Fig. 5

COMMUNICATION SYSTEM COMPANDOR

This invention relates generally to compandors and more specifically to compandors for use in video systems.

Compandors have often been employed in telephone systems. Such compandors operate under conditions where high level signals occur infrequently. Assuming that the signal-to-noise (S/N) ratio required in the presence of these high level signals is the same as that required in the presence of low level signals, the system gain is adjusted to dynamically alter the S/N ratio in response to signal amplitude. For example, relatively loud speech signal in a telephone system will inherently have a higher S/N ratio than soft or low level speech signals. Thus, the louder speech signals may be transmitted at a lower level relative to a standard transmission level and yet obtain an adequate overall S/N performance. The lower level transmission is typically obtained by compressing the signal at the transmitter and then expanding the signal at the receiver. Compandors for telephone service have been highly developed. On the other hand, compandors for video applications are in a relatively early stage of development. A primary reason for the relatively slow development in the video art is because the problems presented by video signals are substantially different from those presented by telephone signals and consequently the techniques developed for telephony have only minimal application to video. For example, there is no statistical peaking effect present in a conventional video image. The likelihood of occurrence of white or black or of any particular color is substantially uniform. Up to date, therefore, the use of compandors in video applications have been based on effects related to the human subjective response to noise and images.

For example, the gray areas of a video signal have been expanded at the expense of the black and white regions because the human eye is less sensitive to noise in the black and white areas. Another technique has been to remove sync pulses at the transmitter to permit larger amplitude excursions of the remaining signal and then to re-insert the sync pulses at the receiver. As a result of the foregoing only relatively small amounts of compandor gain are available in television systems designed to date.

The present invention treats the problem of companding from a totally different point of view compared to what has heretofore been employed. The major premise employed herein is to find a high level signal parameter that represents some portion of a video image but which has statistical properties of infrequent occurrence. In this specification, the term "high level" is used in a general sense in that it is meant to imply a high value of some parameter compared to the average value of such parameter. The essence of the invention is to identify such a signal parameter and use companding techniques to obtain improved information transmission. For example, a signal that has infrequent occurrences of rapid signal rise times might be a signal that is suitable for treatment by the described principles of this invention. Another example is a signal that has infrequent occurrences of high frequency energy compared to its normal state. A third example is a video signal that has infrequent occurrences of high energy levels or amplitude.

A structure for implementing a compandor adapted to signals having infrequent high amplitude pulses is disclosed and claimed in co-pending application Ser. No. 451,711 entitled "Communication System Compandor" by Paul Schnitzler and filed concurrently herewith.

The present invention is directed to companding a signal such as a video signal, or other type signal, by identifying and decreasing fast rates of rise time of amplitude (dA/dt) and identifying and increasing the slow rates of rise time of the signal thereby decreasing the bandwidth required to transmit the signal. At the receiver an inverse transfer function is implemented by appropriate signal processing logic which identifies the rise time rates of the received signal and either increases or decreases such rise time rates so that they become similar to the rise time rates in the corresponding portions of the signal generated at the transmitter before the original changes in the rise time rates were made.

In accordance with a preferred form of the invention there is provided, in a signal transmission system comprising a transmitter, a transmission medium, and a receiver which collectively form a transmission path, a method of companding a signal for improved transmission thereof comprising the steps of determining at the transmitter those portions of the signal having a rate of rise of amplitude (dA/dt) greater or less than a predetermined average dA/dt and decreasing in a non-linear manner the dA/dt of those portions of the signal greater than the predetermined average by an amount which increases as the dA/dt of such portions of the signal increase, increasing in a non-linear manner the dA/dt of those portions of the signal less than the predetermined average by an amount which increases as the rate of rise of such portions of the signal decreases, and increasing and decreasing, at the receiver, those portions of the received signal whose dA/dt's exceed or are less, respectively, than the predetermined average dA/dt in a manner which is the reciprocal of the changes in the dA/dt's imposed upon the signal at the transmitter.

In the drawings:

FIG. 1 is a generalized block diagram of the transmitter employed in the system;

FIG. 2 is a generalized block diagram of the receiver employed in the system;

FIG. 3 shows two transfer functions, one implemented at the transmitter and the other at the receiver, and illustrating the decrease and increases of dA/dt's imposed upon the signal at the transmitter and the reciprocal increases and decreases of dA/dt's imposed upon the signal at the receiver to return it to its original state;

FIG. 4 shows a typical signal having different dA/dt's in different portions thereof before and after changes in the dA/dt's have imposed thereon by the transfer function of curve A of FIG. 3;

FIG. 5 shows the probability of occurrence of sharp rise times before and after the signal has been altered by the transfer function implemented at the transmitter;

Figure 8:
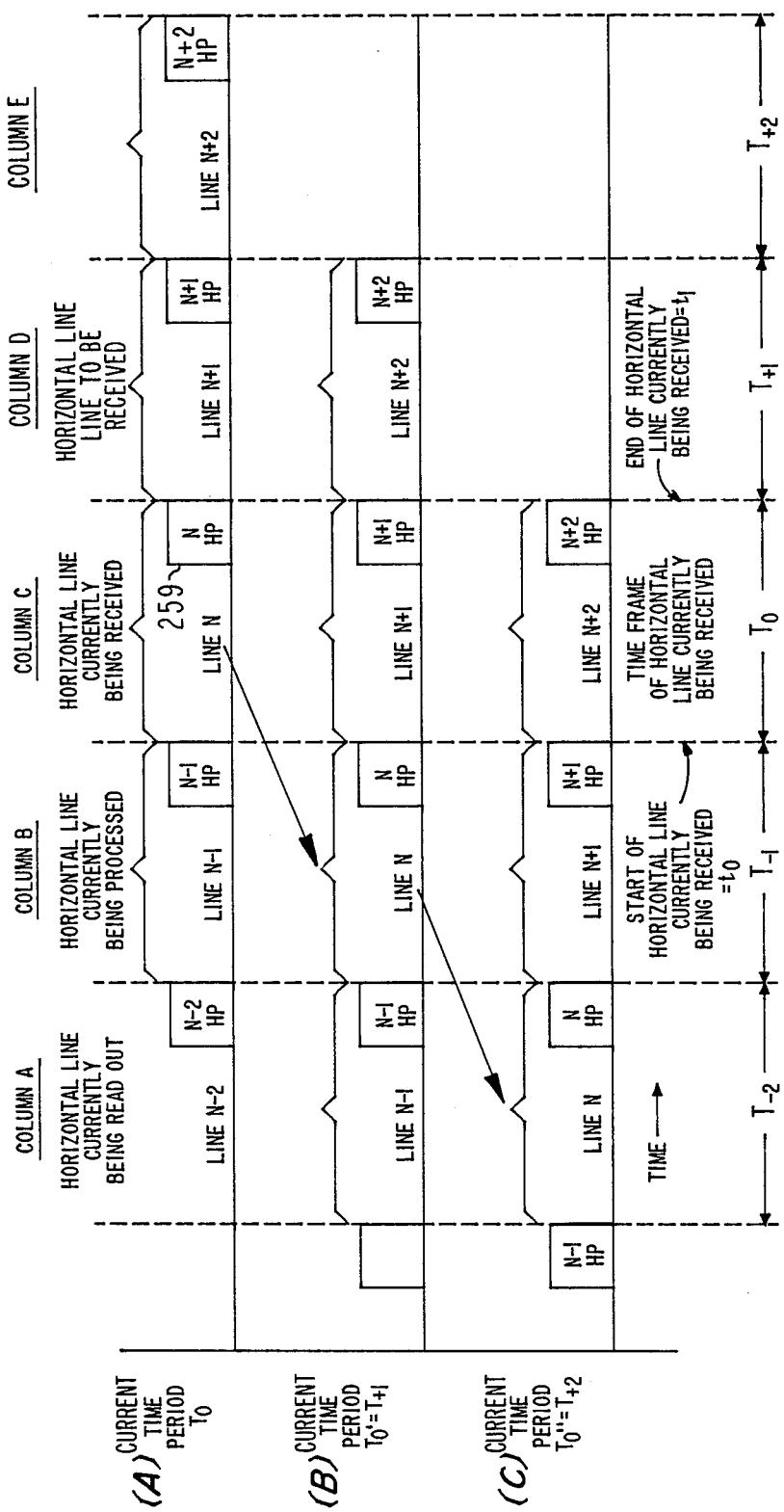
FIG. 8 is a set of timing waveforms to facilitate an understanding of FIG. 7.

In this specification, for purposes of brevity, the waveforms of FIGS. 4 and 8 will be referred to as waveform 4A or 8A rather than as waveform A of FIG. 4 or waveform A of FIG. 8.

Figure 9:
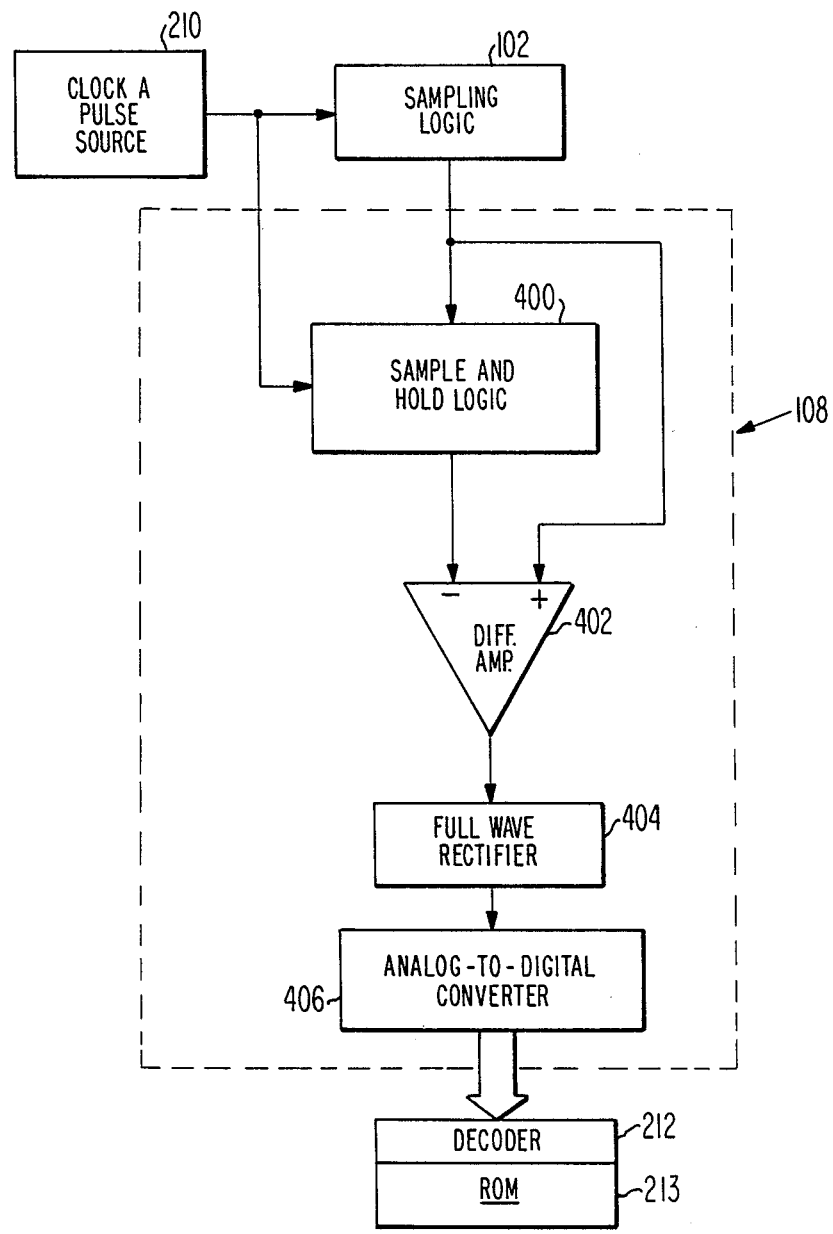
FIG. 9 is a block diagram of a dA/dt detector suitable for use in the invention.

Referring now to FIG. 1 a baseband signal, which can be a video signal, generated by baseband signal source 100 is supplied to sampling means 102 whose output in turn is supplied to rate-of-change of amplitude (dA/dt) detector 108 which can be an RC network followed by an analog-to-digital converter (ADC), not specifically shown in FIG. 1. An alternative dA/dt circuit which generates a digital output signal is shown in FIG. 9. A digital signal is desirable as an input to the time base control logic 110 which receives the output of detector 108.

Sampler 102 samples the amplitude of the baseband signal from source 100 and supplies such amplitude samples to a constant rate write-in shift register which can be a charge coupled device (CCD) type shift register included as part of memory logic 104.

It is important to note that such amplitude samplings are read into the CCD shift register within block 104 at a constant rate. Such amplitude samplings will be read out of another portion of the logic within block 104 at a variable rate in such a manner that those portions of the original signal having high dA/dt's will be slowed down and those portions of the signal having low dA/dt's will be spaced up to provide a smaller range of permissible rates of rise and fall times for the entire signal, thus decreasing the required transmission path bandwidth.

The variable rate read-out portion of memory logic 104 can also be a CCD type shift register into which the contents of the constant rate write-in shift register are transferred periodically and then read out at the variable rate referred to above. The write-in rate and the read-out rate of data into and out of memory logic 104 is controlled by time base control logic 110.

In waveform A of FIG. 4 there is shown a signal before it has been processed by time base control logic 110 and memory logic 104 of FIG. 1 and waveform B of FIG. 4 shows such signal after such processing. The samples a, b, c - - - l of waveform A are equal time-spaced samples of the signal. Those samples taken across a period of high dA/dt's such as sample pairs ab, cd, and ij have their spacing, in effect, time lengthened resulting in a decrease in the dA/dt to produce corresponding sample positions a', b', c', d', i' and j' of waveform B. Sample pairs bc, ef, fg, gh, hi, jk, and kl of waveform A, taken during periods of slower dA,dt's, have their spacing time shortened to produce corresponding sample positions b', c', e', f', g', h', i', j', k', and l' of waveform B.

It is to be understood that to calculate a particular dA/dt the amplitudes of adjacent samplings must be compared in detector 108. For example, comparison of the amplitudes of samples a and b in waveform 4A will provide an approximation of the dA/dt of the amplitude of that portion of the waveform therebetween. The logic of FIG. 1 will alter (decrease) such dA/dt to that shown between the corresponding samplings a' and b' of FIG. 4B.

A suitable dA/dt detector is shown in FIG. 9 and will be described later. In the receiver of FIG. 2 the received waveform B of FIG. 4 will be transformed back into waveform A.

Curve A of FIG. 5 shows the probability of occurrence (the Y axis) versus various dA/dt's ($1/T_r \alpha dA/dt$). As $T_r$, the actual rise time, becomes greater the rate of rise (1/Tr) becomes less, and vice versa. It can be seen from curve A of FIG. 5 that the greatest probable occurrence is a 0 dA/dt and the least probable occurrence is a very high dA/dt. However, there is normally a wide variation between the least and the greatest dA/dt, with the greatest dA/dt determining the bandwidth required for transmission purposes.

Curve B of FIG. 5 shows the probability of occurrence of various rates of rise after processing by time base control logic 110 and memory logic 104 of FIG. 1. It can be seen that the range of dA/dt's is much less than shown in curve A of FIG. 5 and more uniformly distributed, thus requiring considerably less transmission bandwidth than required by the conditions of curve A.

Figure 6:
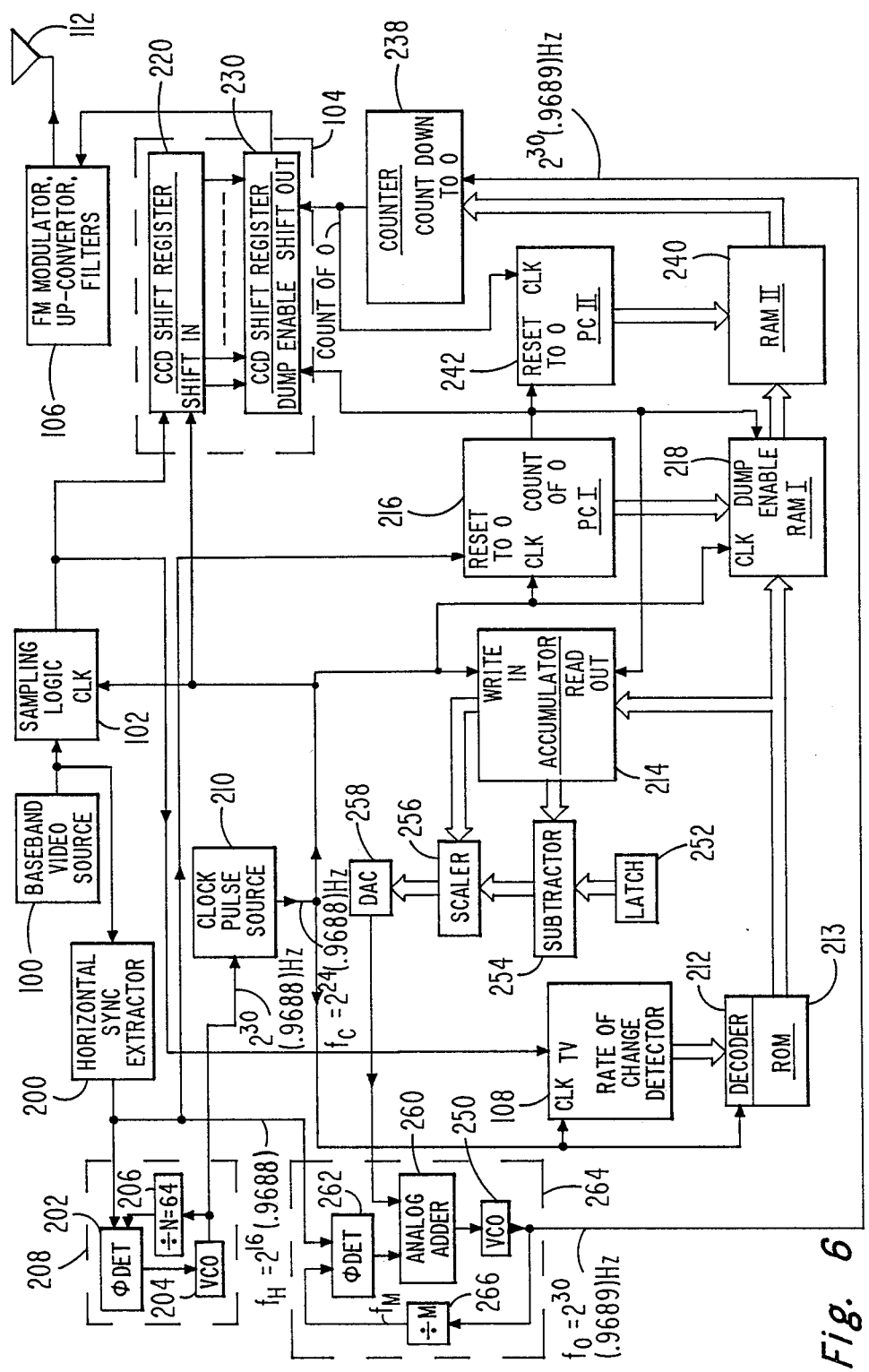
FIG. 6 is a block diagram illustrating suitable logic for implementing the transfer functions of FIG. 3, both at the transmitter and at the receiver.

A detailed block diagram of the logic within block 104 of FIG. 1 and also block 110 is shown in FIG. 6 which will now be discussed in detail.

FIG. 6 shows a detailed block diagram of the time base control 110 of FIG. 1 and the constant write-in and variable rate read-out memory 104 of FIG. 2 along with the other logic blocks of FIG. 1 such as baseband video source 100, sampling means 102, rate-of-change detector 108, FM modulator, up-converter, and filter 106, identified by the same reference characters in FIGS. 1 and 6.

The constant rate write-in and variable rate read-out memory 104 of FIG. 6 consists basically of two shift registers 220 and 230 which, as mentioned above, can be CCD devices. Sampling logic 102 supplies the amplitude samples to shift register 220 in series at the system sampling rate under control of the sampling rate timing pulses supplied from clock pulse source 210 which, in the particular embodiment being described, supplies such pulses at a $2^{24}(0.9688) = 16.25$ MHz.

At the end of a predetermined number of samples (1024 in a horizontal line period), the stages of shift register 220 become full whereupon the contents thereof are transferred in parallel to a second shift register 230 in response to a count of 0 in program counter 216 (PC I). The samples, now stored in shift register 230, must be serially shifted out of shift register 230 at a variable sample rate so that the fast dA/dt's of the video signal are, in effect, slowed down and the slow dA/dt's are speeded up, thus reducing the required transmission bandwidth.

Alternatively, the two shift registers 220 and 230 can be "ping-ponged", that is, samples are read into 220 sequentially and uniformly while samples are read out of 230 under rate control. At the count of 0 in program counter (PC) 216, input, output, shift in, and shift out lines are interchanged by switches (not shown) between shift register 220 and shift register 230. The samples are then read into shift register 220 uniformly and read out of shift register 230 under rate control.

Before considering the logic required to generate the timing necessary to shift the samples out of shift register 230 the logic required to shift the input samples into shift register 220 will be further discussed. A phase locked loop 208 comprising phase detector 202, VCO 204, and divider 206 functions to phase lock the horizontal sync pulses, which are extracted from the output of baseband video source 100 by horizontal sync pulse extractor 200, with the output of VCO 204. Such VCO 204 output is supplied to clock pulse source 210 which responds thereto to generate a train of pulses at the sample rate $2^{24} \times 0.9688$ Hz (based on a horizontal line period of 63.5 $\mu$secs) of the received signal and to supply such clock pulses to several logic blocks including sampling logic 102, rate of change detector 108, decoder 212, accumulator 214, program counter 216, and RAM 218, the functions of which will be explained in the following paragraphs.

Consider now that portion of the logic of FIG. 6 which is employed to generate the variable sample rate signals for shifting out the samples transferred into shift register 230 from shift register 220 at the end of a given horizontal line. Generally speaking, the serial read-out of the samples from shift register 230 is accomplished as follows. The baseband samples supplied from sampling means 102 are supplied to dA/dt detector 108 which responds to the comparisons of sample amplitude to generate and supply a digital signal representative of such dA/dt to the decoder 212 of ROM 213 as an address. The contents of the addressed location of ROM 213 contains a digital count value representative of the particular address (dA/dt) supplied from dA/dt detector 108. Such count value accessed in ROM 213 is supplied both to RAM 218 and to accumulator 214. Similar digital count values are determined for each of the $1024=2^{10}$ samples of a horizontal line of the received video signal from source 100 so that at the end of a received horizontal line the accumulator 214 will have accumulated the total of all 1024 count values. Each of the count values can be different because each of the dA/dt's can be different, but with the total count value approximating a nominal count value which is equivalent to the period of a horizontal line. Worded differently, the actual total count value will probably not be the exact equivalent of a standard horizontal line period since the dA/dt's are different from each sample so that the actual total count value for each horizontal line is approximately equivalent to a standard horizontal line period only in a gross statistical manner.

For each given horizontal line, the count values for each successive sample comparison are stored in successive word locations of RAM 218 successively accessed under control of program counter 216 which is clocked by the output of clock pulse source 210 at the sampling rate of $2^{24} \times 0.9688$ Hz. At the end of the storage of count values constituting an entire received horizontal line, the contents of RAM 218 are dumped into corresponding word locations of RAM 240 during the horizontal flyback period. At the end of the flyback period, the samples of the next horizontal line subsequent to said given horizontal line, are entered into CCD shift register 220, the prior contents thereof (samples of the given horizontal line) having been transferred into shift register 230 during the horizontal flyback period. Also, at the beginning of the next received horizontal line, read out of the samples (the given horizontal line) stored in shift register 230 will be initiated. This is done as follows. The count values representing the samples of the given line stored in RAM 240 are successively read out from RAM 240 and placed in counter 238 which will immediately begin to count down towards 0 in response to clock pulses from voltage controlled oscillator (VCO) 250. When counter 238 reaches a count of 0 for a given count value a sample will be read out from shift register 230 into logic 106 which processes the signal for transmission via antenna 112.

Since each count value can be different from any other count value, the shifting out of the samples from register 230 is accomplished at a variable rate which reflects and compensates for the rate of rise of the samples corresponding to particular count values.

When the entire 1024 count values have been read out of RAM 240, as evidenced by the count of program counter 242 counting through its 1024 count capacity and returning to the count of 0, the RAM 240 will be ready to accept the count values contained in RAM 218 which represent the samples of the next received horizontal line to repeat the process.

For example, a particular pair of samples ab, from sampling logic 102, will produce a value, arbitrarily selected as 45, from the rate of change detector 108 and represents a relatively high value of dA/dt. The decoder 212 and ROM 213 will provide this value, 45, to the accumulator 214 and to RAM 218. Later, when a sample has been shifted from shift register 230, the value 45 is shifted into counter 238. The count down from 45 to 0 under clock control from VCO 250 determines the elapsed time between samples a and b at the output of shift register 230. If the value of dA/dt was determined at the point 132 in FIG. 3, the count value supplied to decoder 212 would have been 64. Thus, the dA/dt would be less.

It is to be noted however, as discussed above, that the total actual count value might be such that it would fall short of, or exceed, the period of a horizontal line unless counted out at a specific and different rate for each horizontal line. Accordingly, some correction must be made in the rate at which counter 238 counts (for each individual count value) in order that it will count through the total count value representing a horizontal line in a standard horizontal line period.

The foregoing is accomplished by changing the frequency of the output of VCO 250. Such change in frequency of the VCO 250 output is accomplished by comparing the total count value accumulated in the accumulator 214 for each individual horizontal line with a nominal count value contained in latch 252 which, if counted out at a predetermined rate, would be equivalent to a standard horizontal line period.

Substractor 254 subtracts the nominal count value in latch 252 from the total count value contained in accumulator 214 at the end of a received horizontal line to provide a difference binary count value which represents the amount that the total actual count value in accumulator 214 exceeds or falls short of the nominal value contained in latch 252. Such difference count value is supplied through a scaler 256 to DAC 258 which converts such difference binary value to an analog value of the proper polarity, a positive value if the total count value is less than the value in latch 252 or a negative value if the count value is greater than the value in latch 252. Such analog value is then supplied to one input of analog adder 260, the output of phase detector 262 being supplied to the other input of analog adder 216. Without the input from DAC 258 the phase lock loop 264 would function in a standard manner so that the frequency $f_m$ of the output signal supplied from divider 266 would equal the horizontal sync pulse rate $f_H$ ($f_m = f_H = 2^{14} 0.9688$ Hz).

The output of analog adder 260 will move towards 0 since as long as there is a voltage at the output of adder 260 the frequency of VCO 250 will change to cause such voltage to move towards 0. In order for the output voltage of adder 260 to equal 0 it is necessary that there be a frequency difference between the frequency $f_M$ at the output of the divide-by-M divider 266 and the extracted horizontal sync, which are applied to the two inputs of phase detector 262. Thus, the phase detector 262 will in fact output a voltage which will be equal to the dc voltage supplied to the other input of adder 260 from DAC 258. Specifically, the two dc voltages supplied to the two inputs of analog adder 260 ultimately will become equal and opposite in order for the output of adder 260 to be 0.

Thus, the dc voltage output of DAC 258 determines the variation of the VCO 250 output frequency from the horizontal sync pulse rate. The value of M in divider 266 is selected so that the input of VCO 250, in the absence of an input to adder 260 from DAC 258 will have a nominal center frequency of $f_0=2^{30}0.9688$ Hz, which is $2^6$ larger than the sample rate. The value $2^6$ is the estimated average output count value for each sample.

It is to be noted that the output frequency $f_0$ of VCO 250 is about the same as the output frequency of VCO 204 but, as will be discussed below, will vary to cause the count down time of the total count value of the sampling count values stored in RAM 240 for a complete horizontal line to be equal to a standard horizontal sync period.

Synchronism of the beginning of the read-out of the samples of each horizontal line from shift register 230 with the horizontal sync pulses extracted from baseband video by the horizontal sync extractor 200 is maintained as follows. The count of 0 of PC 216 resets PC 242 to 0. Further, the count of 0 of PC 216 coincides with the beginning of a new horizontal line by virtue of it being reset to 0 at the occurrence of each horizontal sync pulse. Thus, while it is possible for the time period of read-out of an entire horizontal line from shift register 230 to be slightly different, either shorter or longer than the period of a standard horizontal line, synchronism of the horizontal line will be established at the beginning of read-out of the samples representing each horizontal line from shift register 230. It will be recalled that the count values representing a horizontal line are read from RAM 240 into counter 238 under control of program counter 242.

Thus, in summary, it can be seen that the samples of each horizontal line are read serially into CCD shift register 220 and then, upon entry of all of the samples of a single horizontal line, are tranferred in parallel into CCD shift register 230 where they are read out, during the reception of the samples representing the next horizontal line into CCD shift register 220. The samples representing the line being read out serially from shift register 230 are read out at a rate determined by the frequency output of VCO 250 which is changed for each count value as discussed above.

During the time that the samples representing a horizontal line are being read into shift register 220, the ROM 213 is being periodically addressed by such samples which act as addresses to supply digital values representing the dA/dt, either positive or negative, of the baseband TV signal during such sampling time. The digital values representing the dA/dt are accumulated in accumulator 214 and also supplied successively into RAM 218 under control of PC 216. The horizontal line samples which have been dumped into shift register 230 in parallel from register 220 are read out under control of the output of VCO 250 which has a corrected frequency based on the difference of the total count value accumulated in accumulator 214 and a nominal count value contained in latch 252. The output of VCO 250 clocks counter 238 at a rate such that the total count value in accumulator 214, in increments of the individual count values stored in RAM 240, are read out in a time period substantially equal to the time period of a standard horizontal sync pulse.

It is to be noted that a "ping ponging" technique, similar to the one discussed above re shift registers 220 and 230, can also be employed with RAMs 218 and 240 in that switches (not shown) can be provided which reverse their roles at every count of 0 of PC 216, thus eliminating dumping time.

The logic diagram of FIG. 6 can also be employed at the receiver of FIG. 2. The basic difference in the logic of FIG. 6 when employed at the receiver rather than at the transmitter is that the contents of the word locations of ROM 213 will respond to equal time samples of the received waveform 4B to reproduce the original signal shown in waveform 4A. Otherwise, the operation of the logic of FIG. 6 at the receiver is substantially the same as when employed at the transmitter. Obvious differences are that a receiving antenna corresponding to antenna 114 of FIG. 2 is required and the apparatus within the block 106 of FIG. 6, when used at the receiver, includes a down-converter, an FM demodulator, and appropriate filters as shown in block 116 of FIG. 2. The sampling means 102 corresponds to the sampling means 118 of FIG. 2. The output of the CCD shift register 230 is supplied to an appropriate utilization means 126 which filters and prepares the received signal for display and corresponds to the video reproduction logic 126 of FIG. 2.

The antenna 112, the FM modulator, the up-converter, and the filters indicated within logic 106 of the transmitter application of FIG. 6 obviously are not employed at the receiver.

Figure 7:
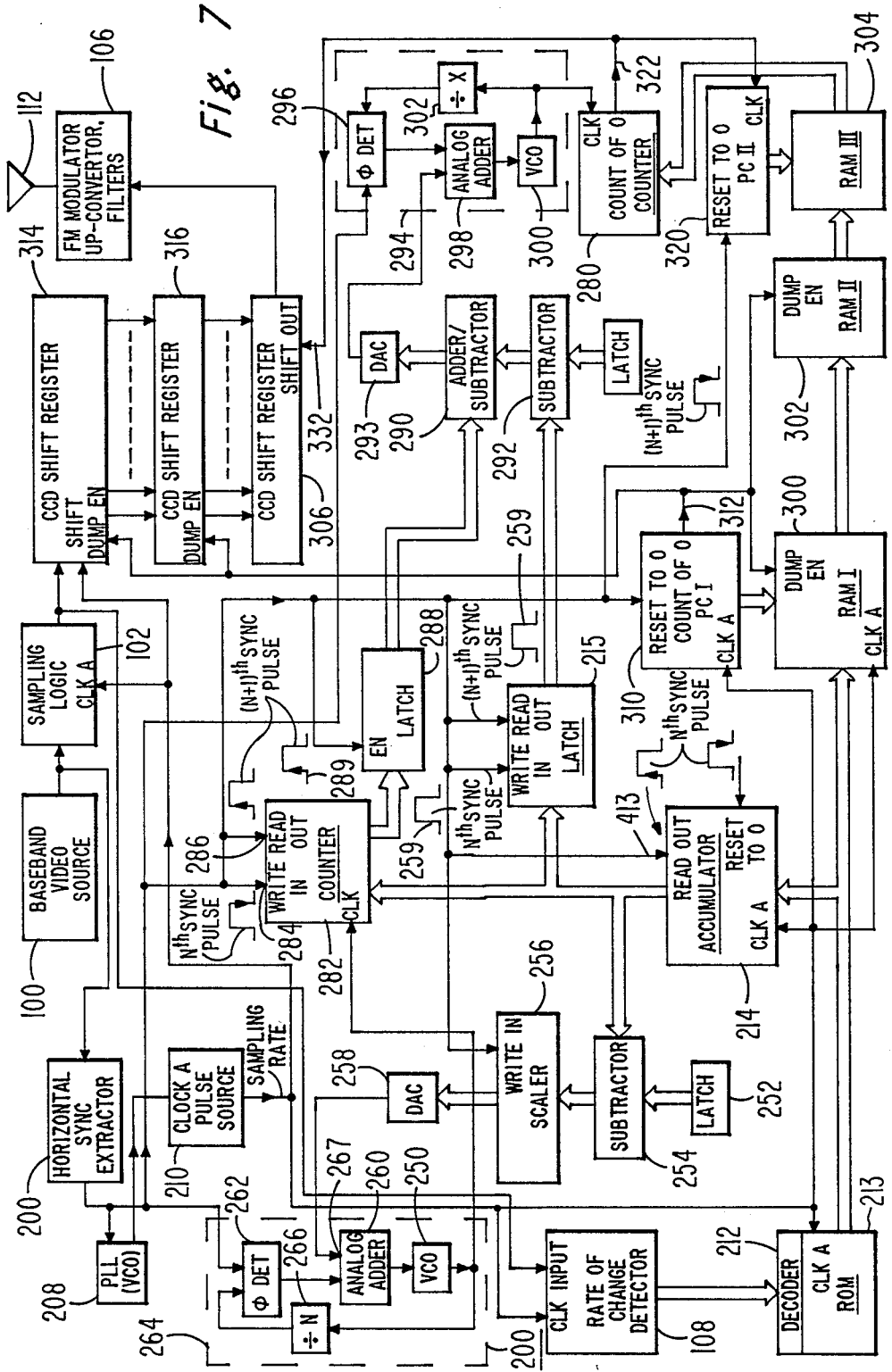
FIG. 7 is another block diagram of logic for implementing the transfer functions of FIG. 3 both at the transmitter and at the receiver.

Referring now to the logic diagram of FIG. 7 there is shown an alternative form for sampling the baseband television signal at one rate and then reading it out at a second rate with high rates of rise times being slowed down and low rates of rise times being speeded up, but with more precision than obtainable with the logic diagram of FIG. 6.

Much of the logic diagram of FIG. 7 can be employed at the receiver in the same manner as much of the logic diagram of FIG. 6 can be employed at the receiver. Furthermore, corresponding elements of FIGS. 6 and 7 are identified by the same reference characters.

Consider now the principal differences in the logic of FIG. 7 over that of FIG. 6. In FIG. 7, the samples of a given horizontal line are supplied to the dA/dt detector 108 which responds thereto to address word locations of ROM 213 whose contents are then supplied to RAM 300 and also to accumulator 214 in much the same manner as the count values accessed in ROM 213 of FIG. 6 are supplied to RAM 218 and accumulator 214.

A basic difference then occurs in the logic of FIG. 7 as compared to that of FIG. 6. The count values stored in RAM 300 and representing samples of a given horizontal line N are dumped into RAM 302 and then processed during the generation of the samples of the next horizontal line (N+1). The actual samples of line N are transferred from CCD shift register 314 to shift register 316 at the end of line N and then transferred to CCD shift register 306 at the end of line (N+1).

During the reception of the samples of horizontal line (N+2) from baseband video source 100 the samples of the first horizontal line N are read out of CCD shift register 306 to logic 106 consisting of an FM demodulator, an up-converter, and appropriate filters 106 and subsequently transmitted via antenna 112 to the receiver.

Thus, in the logic of FIG. 7, and count values representing the samples of each horizontal line N line received from video source 100 for transmission are held in the system for processing during reception of the samples representing the next horizontal line (N+1) and are not transmitted until the samples representing horizontal line (N+2) are being received from source 100. Such a technique provides a full horizontal line period for processing the samples constituting each horizontal line received from source 100. This is different from the operation of the logic in FIG. 6 wherein the samples representing each horizontal line are transmitted during the reception of the samples representing the next received horizontal line from the video source 100.

As will be discussed below, such additional time for processing samples of each horizontal line permits the processing of the total count value received in the accumulator 214 of FIG. 7 twice, thereby obtaining a first order correction similar to that obtained with the logic of FIG. 6 and a second, finer order correction.

In the logic of FIG. 7 the above-mentioned first and second orders of correction are obtained in the following manner. As the samples of horizontal line N are being received by sampling logic 102 (as shown in column C of waveform 8A) the ROM 213 is addressed thereby to supply the count values representing each sample to accumulator 214. At the end of horizontal line N the leading edge of the Nth horizontal sync pulse 259 of waveform 8A, extracted from video source 100 by logic 200, is supplied to the read-out terminal 413 of accumulator 214 to cause the total count value for the entire Nth horizontal line to be supplied to latch 215, counter 282, and also to subtractor 254. In subtractor 254 the nominal count value contained in latch 252 is subtracted from the total count value in accumulator 214 and the difference count value supplied through scaler 256 to DAC 258 where such difference count value is converted to an analog voltage and subsequently supplied to one input 267 of analog adder 260. The phase locked loop logic 264, including analog adder 260, VCO 250, divide-by-N logic 266, and phase detector 262 responds thereto in the same manner as the phase locked loop 264 of FIG. 6 to alter the output frequency of VCO 250 to reflect the aforementioned difference count value so that the total count value accumulated in accumulator 214 for a horizontal line will be counted down to 0 in counter 280 during a time period substantially equal to a standard horizontal line period, as discussed in connection with the logic of FIG. 6.

However, the output of VCO 250 is not directly employed to clock counter 280 which controls the shift-out rate of shift register 306 as in the case of the logic of FIG. 6. Instead, the output of VCO 250 is employed to clock counter 282 down towards 0. It is to be noted that when the contents of accumulator 214 were read out by the leading edge of the Nth horizontal sync pulse 259 such contents were also written into counter 282 by the trailing edge of the Nth sync pulse 259 being supplied to the write in terminal 284 of counter 282.

At the leading edge of the (N+1)th horizontal sync pulse 289, which is supplied to input 286 of counter 282, the contents of counter 282 will be read out to latch 288 which is enabled by the same leading edge of the (N+1)th sync pulse 289. At this time, counter 282 may have counted down beyond 0 and into a negative range, or it may have counted down to a value short of 0. The contents of latch 288, which now contains such residual count of counter 282, is then supplied to an adder/subtractor 290 which either adds or subtracts the residual count of counter 282 to the output of subtractor 292. It should be noted that adder/subtractor 290 contains logic (not specifically shown but well known in the art) for converting the residual count in counter 282 to an appropriate negative value (if needed) based on the most significant bit of such residual value. In general, if the MSB of the residual value is a binary 1 (occurring when the count of counter 282 goes below 0), then the complement of the number supplied to adder/subtractor 290 must be obtained and subtracted from the contents of subtractor 292. A suitable adder/subtractor is disclosed on pages 525–533 of application entitled "Digital Computer and Control Engineering" by R. S. Ledley and published in 1960 by McGraw-Hill.

The contents of subtractor 292 is the same value accumulated in accumulator 214 which represents the gross error of the total actual count value as discussed above. Thus, the output of adder/subtractor 290 is a refined value representing the necessary correction to the clock frequency to be supplied to counter 280.

DAC 293 converts the difference count value to an analog voltage which is supplied to one input of analog adder 298 of phase locked loop frequency generator 294 which further includes phase detector 296, VCO 300, and divide-by-X circuit 302 where $N=2^6$. In addition to the output of divider 302 the horizontal sync pulses extracted from the baseband video signal by sync pulse extractor 200 are supplied to an input of phase detector 296, in the same manner as they are supplied to an input of phase detector 262 of phase locked loop 264 of FIG. 7.

Since the output of DAC 293 is supplied to one input of analog adder 298, the frequency generated by VCO 300 will be altered in accordance with the value thereof to produce an output frequency which will now count down the total count value of the samples representing the Nth line in a time period substantially equal to the actual time period of a standard horizontal line.

It will be observed however, that the count down of the total count values representing the Nth horizontal line will begin at the same time that the samples representing horizontal line (N+2), as shown in waveform 8C, are supplied from sampling logic 102. Thus, some means must be provided to store such count values representing the Nth line until the beginning of line (N+2). Such means is provided by the addition of a third RAM 304 and a third CCD shift register 306 over that required by the logic of FIG. 6. More specifically, after the count values of the Nth line are fully entered into RAM 300 from ROM 213 during time period $T_0$ (column C of waveform 8A) they are dumped into RAM 302 in response to the count of 0 of PC 310 which is supplied from output terminal 312 thereof. It should be noted that PC 310 is clocked by the output of clock pulse source 210 which is the sampling rate and, to maintain system synchronism, is always reset to 0 by the horizontal sync pulse appearing at the output of sync pulse extractor 200. The count of 0 of PC 310 is also supplied to shift registers 314 and 316 and to RAM 302. The contents of shift register 314 are thereby transferred in parallel to shift register 316 and the contents of register 316 transferred in parallel to output shift register 306. Thus, at the end of the reception of the Nth line the samples of line N go from shift register 314 to shift register 316 and the contents of shift register 316, which are the samples representing the (N−1) horizontal line are transferred to shift register 306. Similarly, the contents of RAM 300 are dumped into the corresponding word locations of RAM 302, which prior thereto, contained the the count values representing the samples of horizontal line (N−1).

When the count values representing the samples of horizontal line (N+1) have been received and stored in RAM 300, and the corresponding samplings stored in CCD register 314, another count of 0 will be generated by PC 310 to generate a count of 0 on output lead 312 which will then dump the (N+1) samples from register 314 into register 316 in parallel manner and the N line samples from register 316 to register 306. In a similar manner, the (N+1) count values representing horizontal line (N+1) samples are transferred into corresponding word locations of RAM 302 and the count values representing the samples of horizontal line N are transferred into corresponding word locations of RAM 304, as shown in waveforms 8B and 8C. The program counter 320, which has also been reset to 0 by the negative going trailing edge of the (N+1)th horizontal sync pulse, then successively addresses the word locations of RAM 304 to supply the count values representing the Nth horizontal line now contained therein to the input of counter 280 where they are successively counted down to 0 by means of the input clock pulses from VCO 300.

Each time the counter 280 counts down to 0 from a supplied count value, it will generate a count of 0 output signal at its output terminal 322 which will be supplied to two destinations. The first destination is shift-out input terminal 332 of CCD shift register 306 to shift out one of the samples contained therein to transmission processing logic 106. The second destination of the count of 0 output from counter 280 is to the clock input of PC 320 to cause the next count value to be supplied from RAM 304 to counter 280 where the next count down thereof is done.

To ensure that the beginning of each line generated by the output of CCD shift register 306 is synchronized with the received horizontal sync pulses, the program counter 320 is reset to 0 at the trailing edge of each extracted horizontal sync pulse.

Referring now to FIG. 8 there is shown a timing diagram for the logic diagram of FIG. 7 and illustrates the processing of a received count value for a given horizontal line from the time it is received from baseband video source 100 until the time it is read out of the CCD shift register 306 (FIG. 7) for transmission to a receiver.

More specifically, in FIG. 8 the three timing diagrams, A, B and C, which, for purposes of brevity, will be referred to herein as waveform 8A, 8B or 8C rather than as waveform A, B or C of FIG. 8, represent the status of the count samples of given received horizontal lines (and in particular the count sampling for one horizontal line) during successive horizontal line periods. The horizontal line periods are shown as $T_{-2}$, $T_{-1}$, $T_0$, $T_{+1}$, $T_{+2}$ in FIG. 8, and with $T_0$ always representing the currently received horizontal line. $T_{-1}$ represents the last received horizontal line and $T_{-2}$ the second last received horizontal line. $T_{+1}$ represents the horizontal line next to be received and $T_{+2}$ represents the horizontal line following $T_{+1}$. Along the Y coordinate the time periods $T_0$, $T_{+1}$ and $T_{+2}$ are shown for any given horizontal line. For example, horizontal line N is the horizontal line currently being received as shown in waveform 8A during time period $T_0$.

The prior horizontal line (N−1) received during the prior time period $T_0 \equiv T_{-1}$ is currently being processed by the logic in FIG. 7 to correct for any difference count value that occurred in the reception of such line (N−1). The line preceeding line (N−1), designated as line N−2, is currently being read out of the logic of FIG. 1 as indicated in waveform 8A during the current time period $T_0$. It is to be understood that line (N−2) was received two horizontal line periods prior to the currently received horizontal line N so that along the X axis the time of reception of line (N−2) is designated as time $T_{-2}$.

At the end of the reception of horizontal line N, as indicated at time $t_1$ in FIG. 8, the next line (N+1) will be received during the new current time period $T_0$ as shown in time period $T_0$ of waveform 8B, it being understood that the time period $T_0$ of waveform 8B now represents the time frame of the next received horizontal line (N+1).

During the new time period $T_{+1} \equiv T_0$ of waveform 8B, the horizontal line N is processed to determine, and to compensate for, the difference count value discussed generally above and which will be discussed in more detail below. It will be noted that during the current time period $T_{+1}$ horizontal line (N−1) will be read out of the system for transmission to the receiver.

At the end of the reception of horizontal line (N+1) the next horizontal line (N+2) will be received during time period $T_0 \equiv T_{+2}$ of waveform 8C which is now the new time period $T_0$ of the horizontal line (N+2) currently being received. During this new $T_0 \equiv T_{+2}$ horizontal line period, the line N is being read out of the system for transmission to the receiver, as shown in waveform 8C.

It can thus be seen that line N is received from the baseband video source 100 (FIG. 7) during a given time period $T_0$ and then for the next two horizontal line time periods, $T_{+1}$ and $T_{+2}$, is processed in the logic of FIG. 7, being read out of such logic during time period $T_{+2}$.

Referring now to FIG. 9 there is shown a block diagram of a rate of change of amplitude detector suitable for use in the present invention. In FIG. 9 the clock A pulse source 210, the sampling logic 102, the decoder 210, and the ROM 213 also appear in FIG. 7. The dotted block 108 corresponds to the rate of change (dA/dt) detector 108 of FIG. 7.

Within the dotted block 108 sample and hold logic 400 receives the samples from the output of sampling logic 102 under control of clock pulses from clock pulse source 210. The samples from sampling logic 102 are also supplied directly to a differential amplifier 402. The effect of sample and hold logic 400 is to delay the samples by one sample period so that the two inputs to differential amplifier 402 always represent two consecutively received samples from sampling logic 102. The output of differential amplifier 402 is a dc voltage which represents the difference between the two consecutive samples. Since such difference can sometimes be negative a full wave rectifier 404 is supplied to cause all such differences in the amplitudes of adjacent samplings to be positive. An analog-to-digital converter 406 converts such difference values to digital values which represents the rate of change of amplitude of the signal being sampled and supplies such digital signals to decoder 12 of ROM 213.

What is claimed is:

1. In a signal transmission system comprising a transmitter, a transmission medium, and a receiver, a system for processing a signal to improve the transmission characteristics thereof comprising:

first means for decreasing and increasing, respectively, the rate of change of amplitude (dA/dt) of first and second portions of said signal, respectively, whose dA/dt exceeds or is less than a predetermined dA/dt, in a non-linear manner as the dA/dt of said first and second portions increase or decrease, respectively, to produce a processed signal whose maximum and minimum dA/dt's define a bandwidth less than that of the unprocessed signal, said first means including sampling means for sampling said signal into samples haing a given order of succession, first timing means for generating first clock pulses at a rate $f_c$, first N stage shift register means responsive to said first clock pulses to receive and store said samples in said given order, a dA/dt detector responsive to said samples to determine the dA/dt of adjacent samples, logic means responsive to the dA/dt of adjacent samples to produce and store a count value representative of the time duration between such adjacent samples after the dA/dt has been decreased or increased in accordance with said non-linear rate, adder means for adding the total count value of said count values over each successive group of N count values, where the group of corresponding N samples occupies a time period T, means for determining the number of counts W by which said total count value exceeds or is less than a predetermined nominal count value X, logic comprising a variable timing means for generating second clock pulses and responsive to said count W to alter the frequency $f_2$ of said second clock pulses so that $(X+W)/f_2=T$, second N stage shift register means responsive to the completion of the entry of each group of N samples into said first shift register means to receive the samples stored in said first shift register means, presettable counting means coupled to said logic and responsive to said second clock pulses, second logic means for presetting said stored count values in said presettable counting means in said given order upon the entry of each group of N samples into said second shift register means from said first shift register means, whereby said counting means responds to said second clock pulses to count through successive ones of said count values to output a shift signal each time said counting means counts through one of said count values, said second shift register is responsive to each of said shift signals to shift therefrom one of the samples stored therein; and second means for altering the dA/dt of the processed signal at the receiver in a manner which is the reciprocal of the changes in dA/dt which occurred at said transmitter to reproduce said unprocessed signal.

2. A bandwidth compressor for reducing the bandwidth of a television signal organized into recurrent horizontal lines, comprising:

a source of clock signals having a clock rate;

sampling means coupled to said source of clock signals and to receive said television signal for sampling said television signal at said clock rate to produce a sampled analog signal;

first memory means coupled to said sampling means and to said source of clock signals for recurrently writing in said sampled analog signal at said clock rate for a period equal to one of said horizontal lines;

processing means coupled to said sampling means and responsive to the rate of change of said sampled analog signal to produce a processed analog signal representative of the instantaneous rate of change of said sampled analog signal;

analog-to-digital conversion means coupled to said processing means for generating a digital rate-of-change signal representative of said processed analog signal;

digital memory means coupled to said analog-to-digital conversion means for being addressed by said digital rate-of-change signal, each address of said digital memory means being preprogrammed with a read rate digital word selected to represent that instantaneous read clock rate required to read that signal from which said digital rate-of-change signal was derived in order to have a predetermined rate-of-change providing reduced bandwidth;

accumulation means coupled to said digital memory means for accumulating the values of each said read rate digital word as it is read from said digital memory means to produce an accumulated digital signal representative of the total read-out time required to read said sampled analog signal from said first memory means in order to have said predetermined rate-of-change providing reduced bandwidth;

a source of a standard digital word representative of the time actually available for read-out of each horizontal line from said first memory means;

differencing means coupled to said accumulation means and to said source of a standad digital word for taking the difference between said accumulated digital signal and said standard digital word for forming a difference signal representing the difference between said total read-out time and said time actually available;

read clock control signal generating means coupled to said differencing means and responsive to said difference signal for generating a read clock control signal in response to said difference signal in a manner selected to control the rate of reading of said first memory means to read each of said horizontal lines of sampled analog signal in said time actually available; and control signal coupling means coupled to said read clock control signal geneating means and to said first memory means for coupling said read clock control signal for controlling said reading of said first memory means.

3. A bandwidth compressor according to claim 2, wherein said control signal coupling means further comprises:

third memory means coupled to said digital memory means for storing each said read rate digital word as it is generated until a later time at which said sampled analog signal is read from said first memory means; and programmable counting means coupled to said first memory means and to said third memory means for sequentially receiving said read rate digital words from said third memory means and also coupled to said read clock control signal generating means for receiving said read clock control signal therefrom for recurrently receiving a said read rate digital word, counting a number of pulses of said read clock control signal equal to the number represented by said read rate digital word, and upon completion of each count reading a word of said sampled analog signal from said first memory means and receiving from said second memory means another said read rate digital word.

* * * * *

UNITED STATES PATENT AND TRADEMARK OFFICE
CERTIFICATE OF CORRECTION

PATENT NO. : 4,518,994

DATED : May 21, 1985

INVENTOR(S) : Paul Schnitzler

It is certified that error appears in the above-identified patent and that said Letters Patent is hereby corrected as shown below:

Column 3, line 28, "spaced" should be --speeded--.

Column 14, line 42, "standad" should be --standard--.

Signed and Sealed this

Twenty-fourth Day of September 1985

[SEAL]

Attest:

Attesting Officer

DONALD J. QUIGG

Commissioner of Patents and Trademarks—Designate